United States Patent [19]

Sanderson et al.

[11] Patent Number: 5,557,911
[45] Date of Patent: Sep. 24, 1996

[54] ADJUSTABLE DOFFER COLUMN FOR A COTTON HARVESTER ROW UNIT

[75] Inventors: Leon F. Sanderson, Des Moines; Joel M. Schreiner, Ankeny, both of Iowa

[73] Assignee: Deere & Company, Moline, Ill.

[21] Appl. No.: 551,500

[22] Filed: Nov. 1, 1995

[51] Int. Cl.[6] ................................................ A01B 46/16
[52] U.S. Cl. ........................................ 56/41; 56/40; 56/44
[58] Field of Search ................................. 56/13.5, 15.5, 56/28, 36, 40, 41, 50, 44, 276; 172/273, 741, 742, 793, 796, 816; 403/157, 158, 161

[56] References Cited

U.S. PATENT DOCUMENTS

| | | | |
|---|---|---|---|
| 3,858,665 | 1/1975 | Winker | 172/816 |
| 4,016,936 | 4/1977 | Easterling et al. | 172/796 |
| 4,188,146 | 2/1980 | Stecklein | 172/273 X |
| 4,249,365 | 2/1981 | Hubbard et al. | 56/13.2 |
| 4,742,672 | 5/1988 | Orsborn | 56/41 |
| 4,819,415 | 4/1989 | England et al. | 56/41 |
| 4,850,184 | 7/1989 | Deutsch et al. | 56/41 |

OTHER PUBLICATIONS

Book, "*Machine Design Fundamentals, A Practical Approach*", Title page and pp. 200–201, printed in the U.S.A. in 1983 by Prentice–Hall, Inc.

*Primary Examiner*—Terry Lee Melius
*Assistant Examiner*—Robert Pezzuto

[57] ABSTRACT

Adjustable doffer structure for a cotton harvester row unit provides single wrench doffer adjustment without requiring loosening of a locking nut. The upper end of a doffer column bearing support includes a screw member threaded through an adjusting housing and projecting above the row unit housing. A Belleville spring is sandwiched between a locking nut threaded onto the upper end of the screw member and the adjusting housing. The nut and Belleville spring provide sufficient holding torque to maintain a given doffer adjustment during normal row unit operation, but the holding torque can be overridden with a wrench used to make the doffer adjustment. A locking plate is placed over the nut to maintain locking nut torque.

11 Claims, 2 Drawing Sheets

5,557,911

ADJUSTABLE DOFFER COLUMN FOR A COTTON HARVESTER ROW UNIT

BACKGROUND OF THE INVENTION

1) Field of the Invention

The present invention relates generally to cotton harvesters and, more specifically, to an adjustable doffer column structure for a cotton picker row unit.

2) Related Art

Cotton harvesters of the spindle type such as the John Deere model 9960 Cotton Picker include row units with upright picker drums having spindle bars defining rows of picking spindles. Adjacent each of the picker drums is a doffer column with a plurality of doffer pads supported on a shaft for rotation directly above the rows of spindles to unwrap cotton from the spindles and direct the cotton towards conveying structure on the row unit. For efficient doffing, the vertical position of doffer column must be carefully adjusted relative to the picker drum. If the doffer pads are too close to the spindles, the doffer pads wear quickly and pieces of the pad break off to cause specking of the cotton. Improper adjustment can also put added stress on the spindles and spindle bearings. Therefore, the doffer columns must be adjusted periodically to optimize productivity.

Conventional doffer column adjustment structure includes a doffer adjuster having a threaded adjusting screw with a locking nut located near the top of the row unit housing. To adjust a doffer column, the locking nut is first loosened with a wrench. A second wrench is used to turn the adjusting screw to adjust the vertical position of the column. When the doffer column is in the desired position, the adjusting screw is held with one wrench while the locking nut is tightened with the other wrench. The adjusting procedure can be somewhat awkward and time-consuming. Often, the operator uses one hand to sense the adjustment of the pads relative to the rows of spindles, which can be difficult Various devices, an example of which is shown in U.S. Pat. No. 4,819,415, provide automatic doffer column adjustment. However, most automatic devices are relatively complicated and expensive and are not always reliable.

BRIEF DESCRIPTION OF THE INVENTION

It is therefore an object of the present invention to provide an improved doffer column adjustment for a cotton harvester row unit. It is another object to provide such an adjustment which overcomes most or all of the above-mentioned problems.

It is another object of the present invention to provide an improved doffer column adjustment structure which is simple and inexpensive in construction and which is easy to operate. It is another object to provide such an adjustment structure wherein one hand is free to sense doffer pad position relative to the spindles during adjustment. It is still another object to provide such structure wherein a single wrench is all that is required to make column height adjustments.

It is still another object of the invention to provide an improved doffer column adjustment structure which utilizes a simple locking nut and Belleville spring arrangement for holding a preselected doffer adjustment while facilitating single wrench adjustment of the column without need to loosen the locking nut.

A doffer column adjustment structure constructed in accordance with the teachings of the present invention includes a doffer adjusting housing supported from the upper panel of a row unit. An upper bearing support is adjustably carried within the housing, and the doffer column is vertically supported by a thrust bearing carried within the support. The upper end of the bearing support includes a screw member threaded through the adjusting housing and projecting above the upper panel. A locking nut threaded onto the upper end of the screw member is tightened against a Belleville spring to sandwich the Belleville spring between the nut and the adjusting housing. The nut provides sufficient holding torque to maintain a given doffer adjustment; however, the holding torque can be overridden with the wrench used to make the doffer adjustment. A locking plate is placed over the nut to maintain locking nut torque.

The doffer adjustment can be easily adjusted with one hand on the doffer to sense correct adjustment and one hand on the wrench that turns the screw member. The locking nut does not have to be loosened for the adjustment. The structure is simple and inexpensive and provides ease of adjustment not heretofore available with a doffer screw adjustment mechanism.

These and other objects, features and advantages of the present invention will become apparent to one skilled in the art upon reading the following detailed description in view of the drawings.

DETAILED DESCRIPTION OF THE DRAWINGS

DETAILED DESCRIPTION OF THE DRAWINGS

Figure 1:
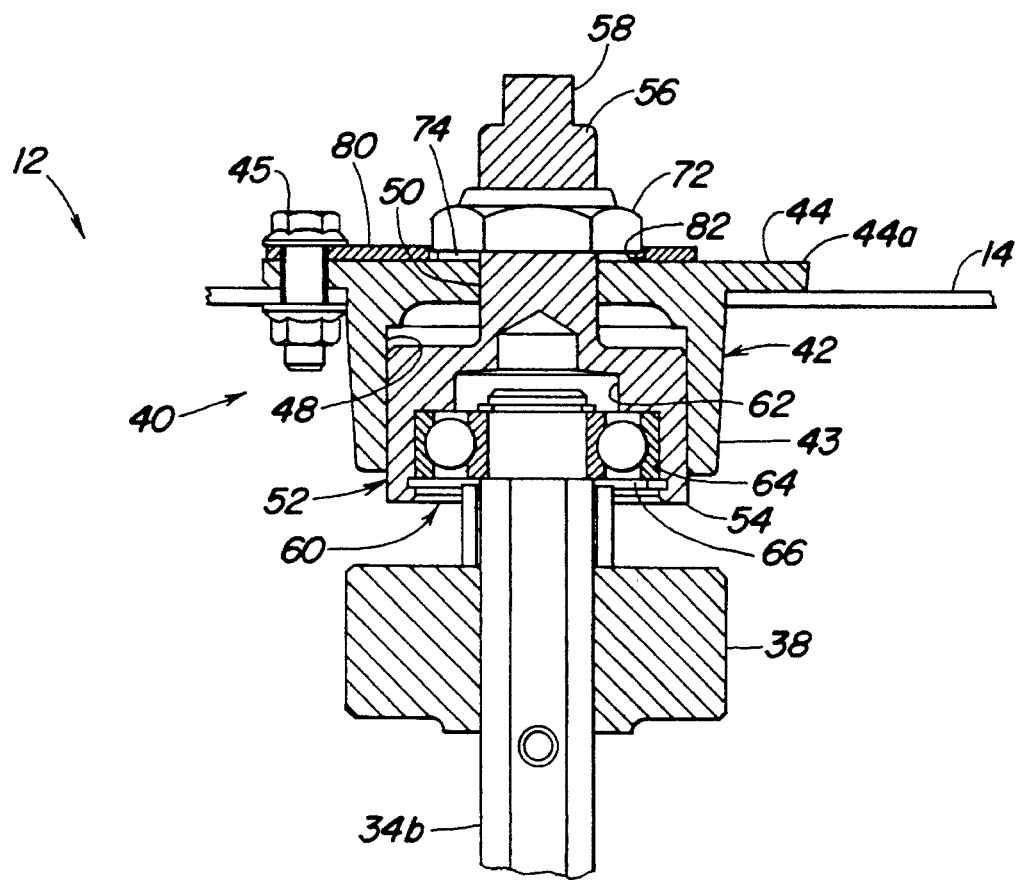
FIG. 1 is a side view of a portion of a cotton harvester row unit showing the upper portion of a doffer column assembly having a doffer adjustment.
Figure 1:
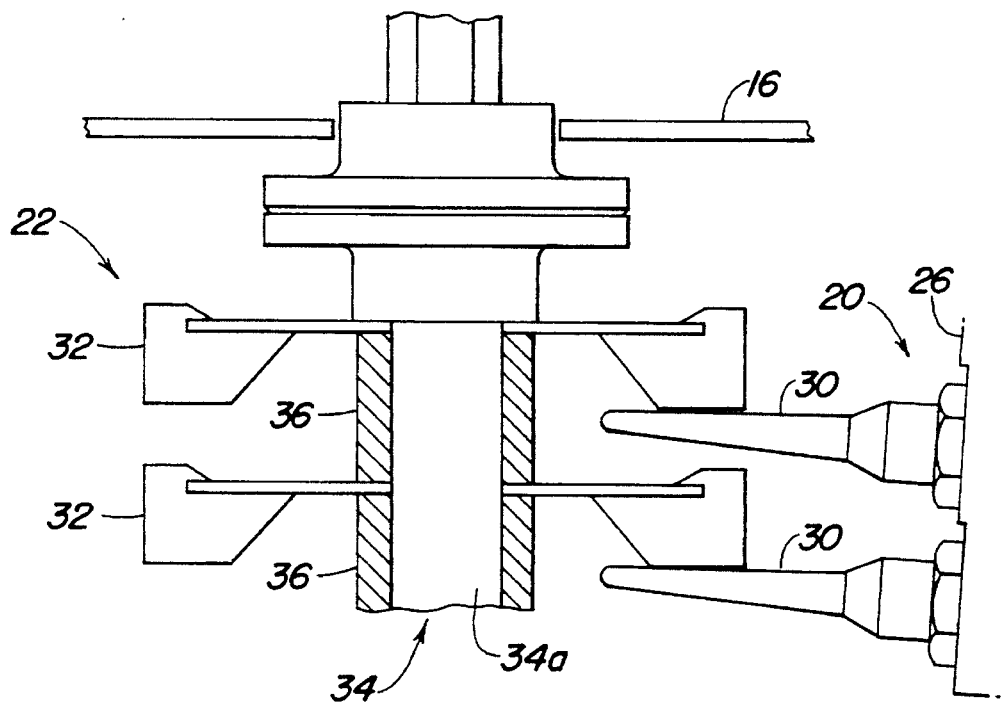

Referring to FIG. 1, therein is shown a portion of a cotton harvester row unit housing 12 with an upper and central horizontal panel structure 14 and 16. Conventional row unit drive structure (not shown) is supported between the panels 14 and 16 and is operably connected to picker drum structure 20 and doffer column structure 22. The drum structure 20 includes vertical picker bars 26 rotatably mounting picker spindles 30 supported in rows from the bars 26. The spindles project into a harvester row receiving area and remove cotton from rows of cotton plants.

The doffer column structure 22 includes doffers 32 supported on upright shaft structure 34 having lower and upper shaft portions 34a and 34b. The doffers are vertically spaced on the shaft portion 34a by spacers 36. A drive gear 38 is fixed to the shaft portion 34b between the panel structure 14 and 16 for rotating the shaft structure 34 about its axis. Each doffer 32 rotates above a row of the spindles 30 and unwraps and removes cotton from the spindles in the row and directs the removed cotton towards suction door structure (not shown) on the row unit.

Figure 2:
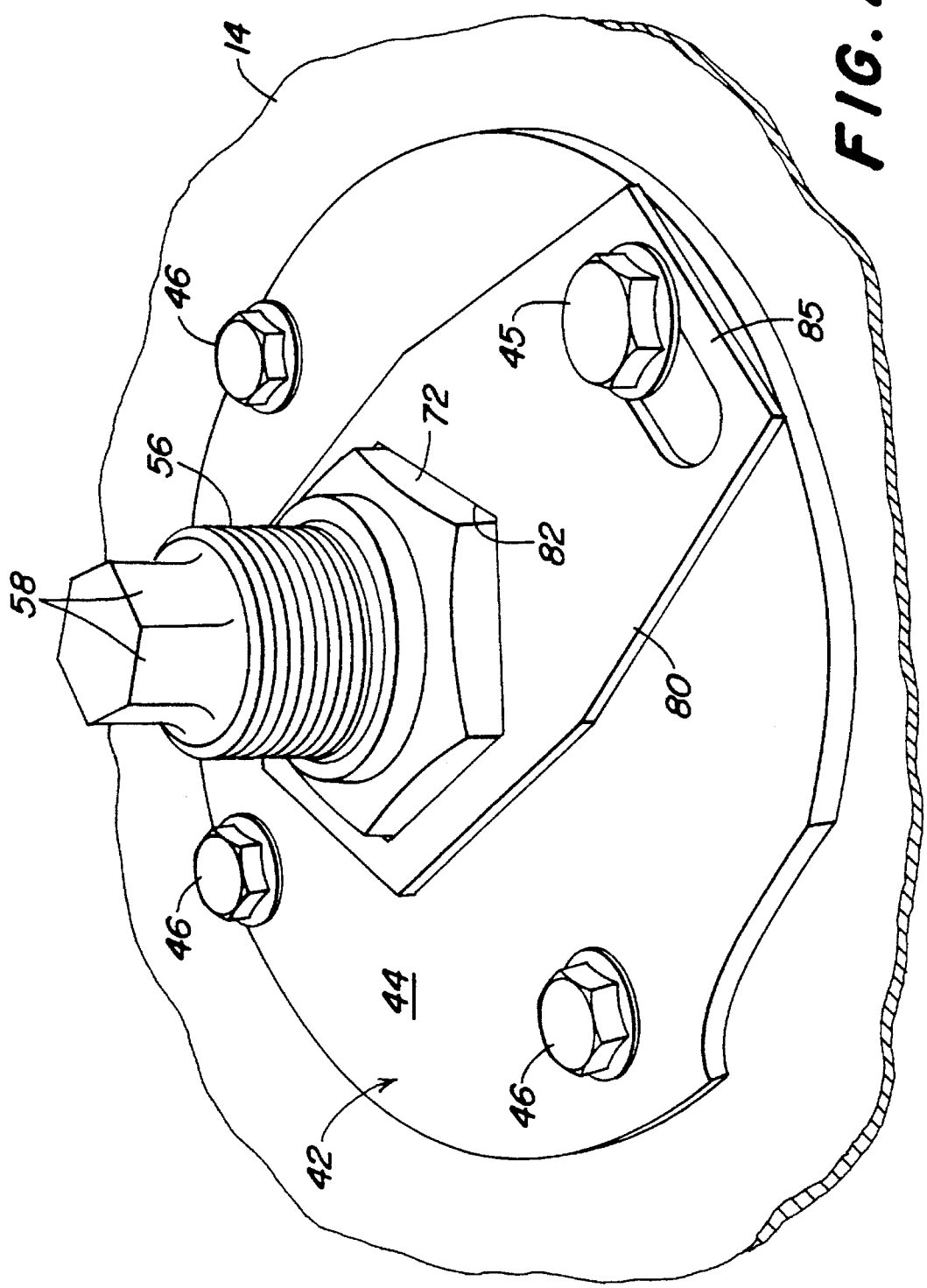
FIG. 2 is an enlarged top perspective view of the top of the doffer adjustment shown in FIG. 1.

Doffer column supporting structure indicated generally at 40 is connected to the upper panel structure 14, and provides vertical support for the rotating shaft structure 34. The supporting structure 40, which is adjustable with a single wrench, includes a doffer adjusting housing 42 having an inverted hollow cup-shaped portion 43 opening downwardly through a circular aperture in the panel structure 14. The housing 42 includes an upper horizontal plate 44 with a radial flange fixed by bolts 45 and 46 (FIG. 2) to the upper panel structure 14. The cup-shaped portion 43 includes a cylindrical bore 48, and a threaded aperture or bore 50 centered on the axis of the shaft structure 34 extends from the cup-shaped portion 43 through the plate 44 to the top of the row unit housing.

A bearing support 52 (FIG. 1) having a body 54 with cylindrical outer surface is slidably received within the cylindrical bore 48 of the adjusting housing 42. A threaded shaft 56 connected to the top of the bearing support body 54 is threaded upwardly through the bore 50 and projects above the panel structure 14. The top of the threaded shaft 56 includes flats 58 for receiving a wrench to turn the shaft and move the body 54 vertically within the bore 48. A thrust bearing assembly 60 rotatably supports the shaft portion 34b within a shouldered bore 62 in the bearing support body 52. The bearing assembly 60 includes a roller bearing 64 held in the shouldered bore 62 by a snap ring 66. The vertical position of the bearing support 52 within the bore 48 therefore determines the location of the doffers 32 relative to the rows of spindles 30. By rotating the shaft 56 with a wrench positioned over the flats 58, the bearing support 52 is moved up or down depending on the direction of rotation.

A locking nut 72 threaded onto the upper end of the shaft 6 and a torque retaining member 74 positioned between the locking nut 72 and the top of the adjusting housing plate 44 provide doffer adjustment holding torque to retain the doffer column 22 in a preselected adjusted position. The member 74 preferably is a non-threaded spring type member such as a Belleville spring. As the locking nut 72 is tightened against the Belleville spring 74, the torque required to turn the threaded shaft 56 in the threaded bore 50 increases. The locking nut 72 is tightened with sufficient torque to prevent the shaft 56 from turning under normal operating conditions of the row unit so that a preselected adjusted position of the doffers 32 relative to the spindles 30 is maintained. To help maintain the locking nut torque, a plate 80 having a nut-shaped aperture 82 is placed over the locking nut 72. A slotted end 85 projects radially from the aperture 82 and is secured in the desired angular position by the bolt 45 which passes through and is tightened against the slotted end 85.

In operation, assuming that the doffer column 22 is in a preselected vertically adjusted position, the Belleville spring 74 is sandwiched between the nut 72 and the plate 44 so that sufficient holding torque is maintained to retain the adjusted position of the column. If the doffer column requires adjustment, for example to move the doffers 32 downwardly to compensate for upward wear of the doffer pads, the operator simply positions a wrench over the flats 58 at the top of the shaft 56 and with one hand applies sufficient force to overcome the position holding torque provided by the nut 72 and the Belleville spring 74. The threaded shaft 56 is rotated within the threaded bore 50 and the nut 72 to move the bearing support 52 down within the bore 48 and to position the doffers closer to the spindles 30. The plate 80 prevents rotation of the nut 72 relative to the housing 42 during the adjustment, and the holding torque is retained so that no nuts need to be loosened before adjustment or tightened after adjustment. During adjustments, the operator has a free hand which he can use to sense proper adjustment of the column 22 as he turns the shaft 56 with the wrench in his other hand.

Having described the preferred embodiment, it will become apparent that various modifications can be made without departing from the scope of the invention as defined in the accompanying claims.

We claim:

1. In a cotton harvester row unit having panel structure, an upright picker drum with rows of spindles and an upright doffer column with doffer pads adapted for doffing cotton from the spindles, doffer column height adjustment structure comprising:

a doffer adjusting housing connected to the panel structure;

a bearing support movably mounted within the doffer adjusting housing and retaining the doffer column at a preselected vertical location dependent on the location of the bearing support;

an adjusting member connected to the bearing support and having a shaft portion threaded vertically through the doffer adjusting housing and rotatable relative to the housing for moving the bearing support vertically upon relative rotation of the shaft portion and housing;

a torque retaining member supported on the shaft portion;

a single locking nut threaded onto the shaft portion and sandwiching the torque retaining member between the locking nut and the doffer adjusting housing, the nut and torque retaining member maintaining a preselected locking torque between the shaft portion and the housing for normally maintaining the preselected vertical location of the doffer column; and wherein the shaft portion includes a wrench receiving portion for rotating the shaft portion relative to the housing while the preselected locking torque is maintained so that loosening of the locking nut to move the bearing support and change the preselected vertical location of the doffer column is obviated.

2. The invention as set forth in claim 1 wherein the torque retaining member comprises a Belleville spring.

3. The invention as set forth in claim 1 wherein the threaded portion includes an end, and wherein the wrench receiving portion comprises flats located on the end.

4. The invention as set forth in claim 1 including a nut locking plate extending over the locking nut to hold the locking nut against rotation as the shaft portion and housing rotate relative to each other.

5. The invention as set forth in claim 1 wherein the nut locking plate includes an aperture conforming to the shape of the nut, wherein the nut projects through the aperture.

6. The invention as set forth in claim 4 wherein the nut locking plate includes angle adjusting structure for securing the nut in one of a plurality of angularly rotated positions relative to the doffer adjusting housing.

7. In a cotton harvester row unit having upper horizontally extending panel structure, an upright picker drum with rows of spindles and an upright doffer column with doffer pads adapted for doffing cotton from the spindles, doffer column height adjustment structure comprising:

a doffer adjusting housing connected to the panel structure;

a doffer column support mounted for vertical movement within the doffer adjusting housing, the doffer column support mounting the doffer column for rotation about an upright axis with the pads at preselected vertical positions relative to the spindles depending on the vertical location of the doffer column support;

an adjusting member connected to the bearing support and having a rotatable shaft portion threaded vertically through the doffer adjusting housing for moving the doffer column support vertically as the shaft portion is rotated;

a torque member supported on the shaft portion;

a single locking nut threaded onto the shaft portion and sandwiching the torque member between the locking nut and the doffer adjusting housing, the sandwiched torque member maintaining a preselected locking torque on the shaft portion for normally securing the adjusting member at a preselected vertical location; and wherein the shaft portion includes a wrench receiving portion and is rotatable while the preselected locking torque is maintained on the shaft portion so that loosening of the locking nut to move the bearing support and change the preselected vertical location of the doffer column is obviated.

8. The invention as set forth in claim 7 wherein the torque member comprises a Belleville spring.

9. The invention as set forth in claim 7 wherein the shaft portion includes an upper end projecting above the horizontal panel structure, and wherein the wrench receiving portion comprises flats located on the upper end.

10. The invention as set forth in claim 7 including means for preventing relative rotation between the locking nut and the doffer adjusting housing.

11. The invention as set forth in claim 7 including an apertured plate supported over the locking nut and preventing rotation of the locking nut while the shaft portion is rotated.

\* \* \* \* \*